3,494,933
N-HYDROXYALKYL DERIVATIVES OF DIPHENYL-SULFONE TETRACARBOXYLIC ACID DIIMIDES
William J. Farrissey, Jr., North Branford, James S. Rose, Guilford, and Adnan A. R. Sayigh, North Haven, Conn., assignors to The Upjohn Company, Kalamazoo, Mich., a corporation of Delaware
No Drawing. Filed May 25, 1967, Ser. No. 641,118
Int. Cl. C07d *27/52;* C07c *103/78;* C08g *22/08*
U.S. Cl. 260—326                            2 Claims

ABSTRACT OF THE DISCLOSURE

Novel N-hydroxyalkyl derivatives of diphenylsulfone tetracarboxylic acid diimides (diphenylsulfone-3,3',4,4'-tetracarboxylic acid diimide is typical) are provided. These polyols are intermediates for cellular and non-cellular polyurethanes. The novel compounds are prepared by reaction of the corresponding tetracarboxylic anhydrides and the appropriate alkanolamine.

BACKGROUND OF THE INVENTION

Field of the invention

This invention relates to novel polyols and is more particularly concerned with novel N-hydroxyalkyl derivatives of diphenylsulfone tetracarboxylic acid diimides and with processes for their preparation.

Description of the prior art

Although diphenylsulfone tetracarboxylic acids are well-known in the art, see for example U.S. Patents 2,673,218 and 3,022,320, it has not previously been suggested that the corresponding N-hydroxyalkyl substituted cyclic diimides thereof could be prepared or that said imide derivatives would be valuable as intermediates in the preparation of polyurethanes, particularly in the preparation of rigid polyurethane foams and of polyurethane elastomers and coatings.

BRIEF SUMMARY OF THE INVENTION

The novel compounds of the invention are those having the formula:

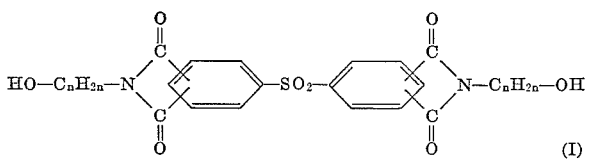

wherein $C_nH_{2n}$ represents alkylene from 2 to 6 carbon atoms, inclusive, and wherein the carbon atoms of each of the imide moieties are bonded to adjacent nuclear carbon atoms in the benzene rings to which the imide moieties are attached.

The term "alkylene from 2 to 6 carbon atoms, inclusive," means a divalent aliphatic hydrocarbon radical having the stated number of carbon atoms therein. Illustrative of such groups are ethylene, 1,2-propylene, 1,3-propylene, 1,4-butylene, 1,2-pentylene, 1,3-hexylene, 2,2-dimethyl-1,3-propylene, 2-methyl-1,4-butylene, 3-methyl-1,2-pentylene, and the like.

The novel compounds of the Formula I are polyols which are useful in the preparation of both cellular and non-cellular polyurethanes which can be prepared therefrom by reaction with polyisocyanates under conditions well-known in the art; see, for example, Saunders et al. Polyurethanes, Chemistry and Technology, Part II, Interscience, New York, 1964. When used in the preparation of rigid polyurethane foams, either as the sole polyol component or as a major proportion of the polyol component, the polyols (I) of the invention impart high compressive strength and enhanced fire resistance to the resulting foams. The polyols (I) of the invention are particular useful in the preparation of polyurethane elastomers including supported and unsupported films in accordance with the procedures cited above. For this purpose the polyols (I) are used in place of or in combination with the diols commonly used in accordance with said known procedures. The elastomers so obtained exhibit a high degree of resistance to degradation by exposure to solvents including organic solvents, cold aqueous alkali and aqueous acid. Accordingly said elastomers are particularly adapted for use in coating surfaces, such as the interior and exterior surfaces of chemical reaction vessels, storage tanks, and the like, which are subject to prolonged exposure to a wide variety of solvents, acids, and alkalies.

In addition to their usefulness in the preparation of polyurethanes, the novel polyols (I) of the invention as useful as chemical intermediates. For example they can be reacted with monoalkanolamines such as ethanolamine, propanolamine, butanolamine and the like, generally in the absence of solvent and without application of external heat, to form the corresponding N,N',N'', N'''-tetra(hydroxyalkyl) diphenylsulfone tetracarboxamide having the formula:

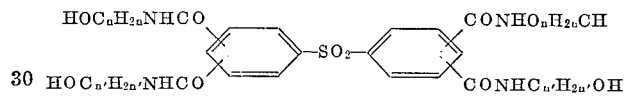

wherein $C_nH_{2n}$ is as hereinbefore defined and —NHC$_{n'}$H$_{2n'}$·OH represents the residue of the alkanolamine employed in the reaction.

The latter compounds are themselves useful as polyols for the same purposes as those described above for the polyols (I) of the invention.

Detailed description of the invention

The novel polyols (I) of the invention are obtained conveniently by reaction of the appropriate alkanolamine HOC$_n$H$_{2n}$NH$_2$ (II), wherein C$_n$H$_{2n}$ is as hereinbefore defined, with the appropriate diphenylsulfone tetracarboxylic acid dianhydride having the formula:

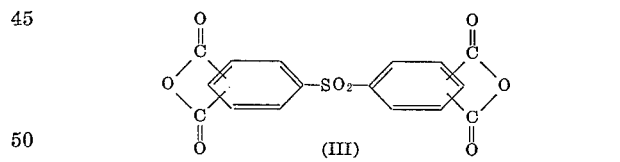

wherein the carbon atoms of the anhydride moieties are bonded to adjacent nuclear carbon atoms in the benzene rings to which said moieties are attached.

In carrying out said reaction the anhydride (III) and the alkanolamine (II) are brought together in approximately stoichiometric proportion, i.e. 2 moles of alkanolamine for each 1 mole of dianhydride. The order of which the components are mixed is not critical. The reaction can be carried out, if desired, in the presence of an inert organic solvent but is generally accomplished satisfactorily in the absence of a solvent. By "inert organic solvent" is meant an organic solvent which does not enter into reaction with any of the reactants or in any way interfere with the desired course of the reaction. Examples of such solvents are benzene, toluene, xylene, Decalin, Tetralin, diethyl ether, tetrahydrofuran, dimethylformamide, and the like.

The reaction between the alkanolamine (II) and the anhydride (III) is exothermic and proceeds spontaneously. In certain instances it may be necessary to heat the reaction mixture, e.g. to about 50° C. to 100° C., in order to ensure completion of the reaction. The reaction can be accomplished in the presence of an inert organic solvent, if desired, such as those exemplified above, but is generally accomplished satisfactorily without the need to use any solvent. The progress of the reaction can be followed by conventional procedures, for example, by infrared spectroscopic analysis of aliquots to determine the disappearance of absorption bands characteristic of anhydride groups and the appearance of absorption bands corresponding to the imide groups.

When the end point of the reaction has been reached, as determined, for example, by the methods outlined above, the desired polyol (I) is readily isolated from the reaction mixture by conventional procedures. When no solvent has been employed in the reaction the polyol (I) generally needs no isolation but can be purified by conventional procedures such as recrystallization. When a reaction solvent has been employed the solvent can be removed by evaporation and the residual polyol (I) can be purified by the above procedures.

The diphenylsulfone tetracarboxylic acid dianhydrides (III) employed as starting materials in preparing the novel polyols of the invention are well-known in the art, as are methods for their preparation; see, for example, U.S. Patent 3,022,320. The alkanolamines (II) employed as starting materials in preparing the novel polyols of the invention are also well-known in the art, as are methods for their preparation; see, for example, Chemistry of Carbon Compounds vol. IA, p. 689 et seq., edited by E. H. Rodd, Elsevier, New York, 1951. Illustrative of said alkanolamines are ethanolamine, propanolamine, butanolamine, 1-amino-propan-2-ol, 2 - aminopropan - 1 - ol, 1-aminobutan-2-ol, 1-amino-2-methylpropan - 2 - ol, and 1-aminopentan-5-ol.

The following examples describe the manner and process of making and using the invention and set forth the best mode contemplated by the inventors of carrying out the invention but are not to be construed as limiting.

EXAMPLE 1

N,N'-di(2-hydroxyethyl)diphenylsulfone-3,3',4,4'-tetracarboxylic acid diimide

A 100 ml. round bottomed flask fitted with a stirrer, reflux condenser and thermometer was flushed with nitrogen and then charged with 25 g. (0.0697 mole) of diphenylsulfone-3,3'-4,4'-tetracarboxylic acid dianhydride and 8.5 g. (0.1395 mole) of ethanolamine. An immediate exothermic reaction took place and rapid stirring was effected under a nitrogen blanket. When the exotherm subsided the resulting product was stirred and heated at 120° C. to 140° C. for 40 minutes. At the end of this period the reaction mixture solidified to a white solid (25.9 g.) having a melting point of 207° C. to 216° C. A 5.1 g. sample was refluxed for 4 hrs, in 100 ml. of ethanol. The resulting solution was cooled to room temperature (circa 25° C.) and the crystalline solid which separated was isolated by filtration. There was thus obtained 4.6 g. of N,N'-di-(2-hydroxyethyl) diphenylsulfone-3,3',4,4'-tetracarboxylic acid diimide in the form of a white microcrystalline solid having a melting point of 219° C. to 221° C.

*Analysis.*—Calcd. for $C_{20}H_{16}N_2SO_8$: C, 54.15; H, 3.63; N, 6.32. Found: C, 53.89; H, 3.50; N, 6.33.

EXAMPLE 2

N,N'-di(3-hydroxypropyl)diphenylsulfone-3,3',4,4'-tetracarboxylic acid diimide

Using the procedure described in Example 1, but replacing ethanolamine by propanolamine, there is obtained N,N' - di(3 - hydroxypropyl)diphenylsulfone - 3,3',4,4'-tetracarboxylic acid diimide.

Similarly, using the procedure described in Example 1, but replacing ethanolamine by butanolamine, 1-aminopropan-2-ol, 2-aminopropan-1-ol, 1-aminobutane-2-ol, 1-amino-2-methylpropan-2-ol, or 1-aminopentan-5-ol, there are obtained N,N'-di(4-hydroxybutyl), N,N'-di(2-hydroxypropyl), N,N'-di(1-methyl-2-hydroxyethyl), NN,'-di(2-hydroxybutyl), N,N'-di(2-hydroxy-2-methylpropyl), and N,N'-di(5-hydroxypentyl) diphenylsulfone-3,3',4,4'-tetracarboxylic acid diimide, respectively.

EXAMPLE 3

This example shows the preparation of an elastomer from a polyol of the invention.

A mixture of 50 parts by weight of an isocyanate terminated prepolymer (Adiprene L–100) prepared from tolylene diisocyanate and polytetramethylene glycol and having an equivalent weight of 1030, and 9.6 parts by weight of N,N' - di(2 - hydroxyethyl)diphenylsulfone - 3,3',4,4'-tetracarboxylic acid diimide (prepared as described in Example 1) was rapidly heated to 170° to 189° C. and maintained thereat (10 minutes) until a homogeneous solution was obtained. The resulting solution was cast on a open tray and cured at 135° C. for 1 hour. The elastomer so obtained was stripped from the tray and cured for a further 16 hrs. at 80° C. The cured elastomer was then tested and found to possess the following properties:

Hardness, Shore A (ASTM D676–59T) -------- 71–69
Tensile strength, p.s.i. (ASTM D412–62T) ------ 3430
Elongation, percent (ASTM D412–62T) ------- 780
Modulus 100%, p.s.i. (ASTM D412–62T) ------ 355
Die C tear strength, p.l.i. (ASTM D624–54) ---- 185
Split tear strength, p.l.i. (ASTM D1928–62T) --- 52
Tensile set, percent (ASTM D412–62T) ------- 0

Samples of the elastomer were immersed for 7 days at circa 20° C. in each of the following solvents: dimethylsulfoxide, methyl ethyl ketone, 10% aqueous hydrochloric acid, 10% aqueous sodium hydroxide solution, ethyl acetate and butanol. At the end of the immersion no sign of swelling or degradation could be detected in any sample.

We claim:
1. A compound having the formula:

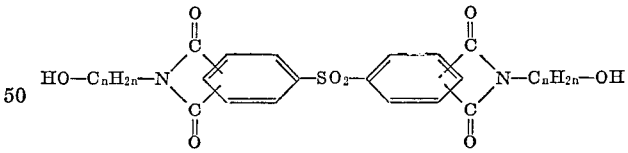

wherein $C_nH_{2n}$ represents alkylene from 2 to 6 carbon atoms, inclusive, and wherein the carbon atoms of each of the imide moieties are bonded to adjacent nuclear carbon atoms in the benzene rings to which the imide moieties are attached.

2. N,N'-di(2-hydroxyethyl) diphenylsulfone - 3,3',4,4'-tetracarboxylic acid diimide.

References Cited

UNITED STATES PATENTS 3,022,320    2/1962    Bennett et al. _____ 260—346.3

ALEX MAZEL, Primary Examiner

J. A. NARCAVAGE, Assistant Examiner

U.S. Cl. X.R.

260—346.3, 559